METHOD OF OBTAINING AUDIO FEEDBACK FROM
A MODULATED R. F. AMPLIFIER
Filed July 12, 1954
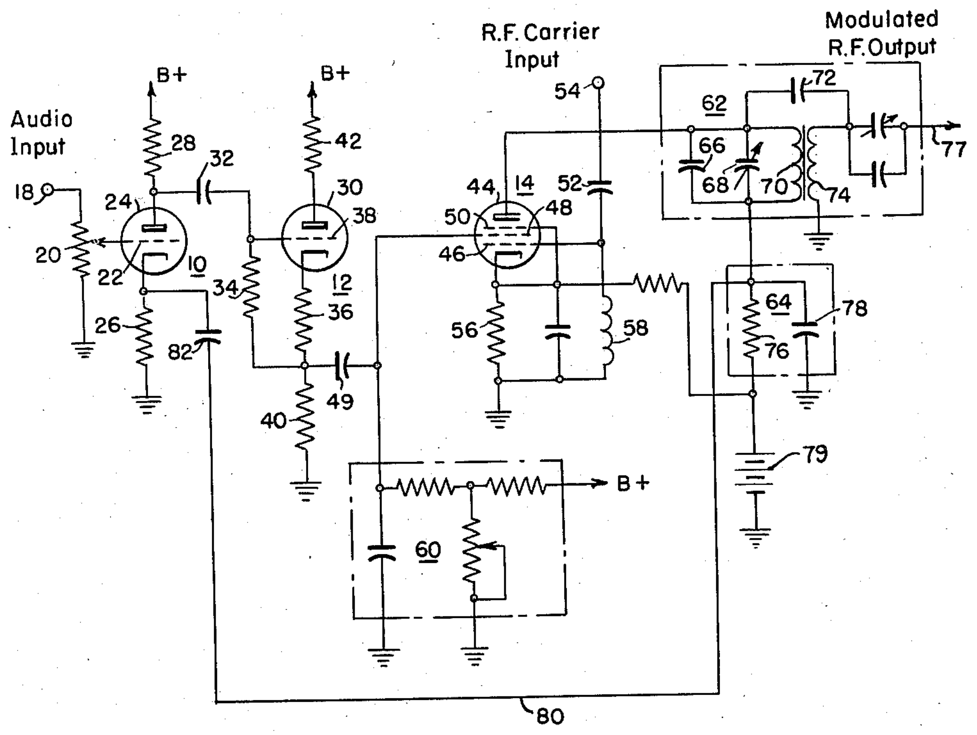
WITNESSES:
E. A. McCloskey
T. N. Murray
INVENTORS
David M. Chauvin
and Bernard L. Harris.
BY
F. E. Browder
ATTORNEY 2,858,511
Patented Oct. 28, 1958

2,858,511

METHOD OF OBTAINING AUDIO FEEDBACK FROM A MODULATED R. F. AMPLIFIER

David M. Chauvin, Glen Burnie, and Bernard L. Harris, Baltimore, Md., assignors to Westinghouse Electric Corporation, East Pittsburgh, Pa., a corporation of Pennsylvania Application July 12, 1954, Serial No. 442,708

7 Claims. (Cl. 332—37)

This invention relates to modulated radio frequency amplifiers and more particularly to a negative feedback system for a modulated radio frequency amplifier.

The conventional low-level modulated R. F. amplifier consists of several stages of amplification for amplifying an audio input signal together with a modulator tube for combining the amplified audio signal with radio frequency carrier energy to thereby produce an amplitude modulated R. F. output signal. The plate circuit of thet modulator tube is coupled through a band pass network to an R. F. load circuit which may include a transmission line or antenna. In obtaining audio feedback from this type of amplifier-modulator combination to correct harmonic distortion in the output signal, it is ordinarily necessary to sample some of the modulated R. F. output in the load circuit of the system, detect the sample, and then apply the detected signal back to one of the low level audio amplifier stages with the corrected phase and magnitude.

The conventional feedback system just described is cumbersome and in some installations is entirely unworkable. For example, some applications of modulated R. F. amplifier networks require that the outputs of several of such networks be applied to a single conductor or transmission line where, if detection where to be performed, audio signals from all the networks would be derived. A feedback loop connected to such a detector would cause cross modulation between the various modulators of the system. That is, the audio signal of one modulated R. F. amplifier would be combined with the audio signals of the other modulated R. F. amplifiers, and vice versa, so that the resulting audio output of the entire system would be unintelligible at some distant receiver.

The present invention provides a means whereby audio feedback may be derived from various modulated R. F. amplifiers which are connected to a common transmission line or antenna. This is accomplished without the use of detectors by sampling the modulated R. F. output in the plate circuit of the modulator tube rather than in the load circuit as was the previous practice. It will be seen from the following description that the sampled R. F. ouput in the plate circuit is isolated from the load circuit and the other modulated R. F. amplifiers because of the inductively coupled band pass network which exists between the plate and load circuits. Therefore, the cross moduation referred to above can not occur in the present invention.

Although the invention is intended primarily for use in installations employing more than one amplifier, it will be readily understood from the following description that it is not limited to use with a plurality of modulated R. F. amplifiers, but may be used equally well with a single amplifier-modulator network.

Other features and advantages of the invention will become apparent from the following description taken in connection with the accompanying single-figure drawing which illustrates the invention in schematic circuit form.

Referring to the drawing, an amplifier-modulator combination is shown having a pair of amplification stages 10 and 12 connected to a modulator network 14. A source of audio voltage, not shown, is connected to input terminal 18 of amplification stage 10. This terminal is connected through a variable resistance 20 to grid 22 of amplifier tube 24. The cathode and anode of tube 24 are connected through resistors 26 and 28, respectively, to a source of anode voltage. Tube 24 is resistance-coupled to a second amplifier tube 30 by means of a direct-current blocking capacitor 32 and a grid resistance 34. Cathode resistance 36 is used in conjunction with resistance 34 to vary the bias on grid 38 of tube 30. A source of direct-current voltage is supplied to tube 30 through resistors 40 and 42 as shown.

Coupled in cathode follower relationship with the second amplifier stage 12 is modulator tube 44. Included within tube 44 are control grid 46, screen grid 48 and suppressor grid 50. Screen grid 48 is connected to the junction of resistors 40 and 36 through direct-current blocking capacitor 49, and control grid 46 is connected through condenser 52 and input terminal 54 to a source of radio frequency carrier energy, not shown. In order to bias grid 46 with respect to the cathode of tube 44, a connection is provided between grid 46 and one end of resistor 56 through a radio frequency choke 58. A positive direct-current bias is provided for screen grid 48 through a voltage adjusting device 60. Suppressor grid 50 is connected directly to the cathode of tube 44 to improve the operating characteristics of the tube in a manner well known in the art.

It is apparent that the signal appearing in the anode circuit of tube 44 will include two main components: i. e., the audio signal applied to screen grid 48 and a radio frequency modulated carrier signal. The latter component comprises an R. F. carrier signal in the form of a modulated envelope. For feedback purposes, only the audio component found in the anode circuit can be applied to the audio amplification stages. Therefore, some means must be provided for separating the aforesaid two components. To this end, a pair of separating networks 62 and 64 are included in the anode circuit of tube 44.

Network 62 comprises an output filter system and includes a parallel resonant circuit composed of capacitances 66, 68 and inductance 70. Capacitance 68 is variable and is adjusted so that the resonant circuit is tuned to the frequency of the carrier energy applied to grid 46. The filter system, therefore, will present a high impedance to the modulated carrier energy appearing in the plate circuit of tube 44. Because of the relatively low frequency range of the aforesaid audio component, network 62 effectively becomes a low impedance conductance path for this audio component. One side of inductance 70 is connected through condenser 72 to a second inductance 74. This inductance is also magnetically coupled to inductance 70 and is included in an output load circuit so that the modulated R. F. signal produced by tube 44 will appear between output terminal 77 and ground.

Connected in series relationship with network 62 is the second network 64 comprising the parallel combination of resistance 76 and capacitor 78. Capacitor 78 acts as a radio frequency bypass condenser and is connected directly to ground. Resistance 76 is also connected to ground through a source of anode voltage 79, the negative terminal of which is grounded. It can be seen, therefore, that by selecting the correct values for elements 76 and 78 in this network, any carrier energy component of the modulated signal which might pass through network 62 will be shunted to ground through capacitor 78, and the audio component will appear across resistance 76. This audio component is applied through path 80 to cathode resistor 26 in the cathode circuit of amplifier 24 in inverse feedback relationship. Included in path 80 is a direct-current blocking capacitor 82. Note that the feedback circuit includes the two capacitors 78 and 82. These capacitors will tend to make the feedback circuit and, consequently, the entire output of the system responsive to changes in audio frequency. It is, however, desirable that the system have a "flat" response in the audio frequency range. That is, it is desirable that the system be unresponsive or at least substantially unresponsive to frequency changes in the audio range. Otherwise, the depth of modulation of the modulated envelope appearing at terminal 77 will vary with the audio frequency changes which will necessarily occur in the input audio signal. By making the time constant (i. e., the product of resistance times capacitance) for the combination of resistance 76 and capacitor 78 approximately equal to the time constant of the combination of resistance 26 and capacitor 82, "flat" response in the audio range is derived.

The present invention, therefore, provides a means for reducing the harmonic distortion caused by a modulator tube in a low level modulated R. F. amplifier by introducing a device directly into the plate circuit of the tube for separating the modulated R. F. component and the audio component and applying this audio signal to a preceding amplifier stage in inverse feedback relationship.

Although a single embodiment of our invention has been shown and described in detail, it will be understood by those skilled in the art that various changes in form and arrangement of parts may be made to suit requirements without departing from the spirit and scope of this invention.

We claim as our invention:

1. A modulating system comprising a plurality of amplifier tubes connected in cascade relationship, grid and plate circuits for each of said tubes, a source of audio voltage connected to the grid circuit of the first of said cascade-connected amplifier tubes, a source of radio frequency energy, a modulator tube adapted to modulate said radio frequency energy in response to audio voltages produced in the plate circuit of the last of said cascade-connected amplifier tubes, an anode and a cathode for said modulator tube, an electron path connecting said anode and cathode and including a pair of conductive networks joined in series relationship, one of said networks including the parallel combination of an inductance and a capacitance and the other of said networks including a resistance and a capacitance connected to bypass radio frequency energy around said resistance, a load circuit inductively coupled to the inductance of said one network, a feedback path including a resistor and a capacitor connecting the junction of said networks with the grid circuit of said first amplifier tube, the time constant of the resistor and capacitor in said feedback path being substantially equal to the time constant of the resistance and capacitance in said other network whereby the feedback voltage is maintained substantially unresponsive to frequency changes over the frequency range of said audio voltage.

2. A modulating system with distortion correction comprising a plurality of cascade-connected amplifier tubes, grid and plate circuits for each of said tubes, a source of audio voltage connected to the grid circuit of the first of said cascade-connected amplifier tubes, a source of radio frequency energy, a modulator tube adapted to modulate said radio frequency energy in response to audio voltages produced in the plate circuit of the last of said cascade-connected tubes, an anode and a cathode for said modulator tube, an electron path connecting said anode and cathode and including a pair of conductive networks joined in series relationship, one of said networks comprising a parallel resonant circuit tuned to the frequency of said radio frequency energy, the other of said networks comprising a resistance and a capacitance connected to bypass certain alternating current signals around said resistance, said capacitance having a low impedance with respect to radio frequency energy, and a feedback path including a resistor and a capacitor in series connecting the junction of said networks with the grid circuit of said first amplifier tube, said feedback path being adapted to apply voltages produced across said resistance to said grid circuit, the time constant of the resistor and capacitor in said feedback path being substantially equal to the time constant of the resistance and capacitance in said other network.

3. A modulating system with distortion correction comprising a plurality of cascade-connected amplifier tubes, grid and plate circuits for each of said tubes, a source of audio voltage connected to the grid circuit of the first of said cascade-connected amplifier tubes, a source of radio frequency energy, a modulator tube adapted to modulate said radio frequency energy in response to audio voltages produced in the plate circuit of the last of said cascade-connected amplifier tubes, an anode and a cathode for said modulator tube, an electron path connecting said anode and cathode and including a pair of conductive networks joined in series relationship, one of said networks comprising a parallel resonant circuit having a high impedance with respect to the frequency of said carrier energy and a low impedance with respect to the frequency of said audio voltage, the other of said networks comprising a resistance and a capacitance connected to bypass certain alternating current signals around said resistance, said capacitance having a low impedance with respect to radio frequency energy, and a feedback path including a resistor and a capacitor in series connecting the junction of said networks with the grid circuit of said first amplifier tube, the time constant of the resistor and capacitor in said feedback path being substantially equal to the time constant of the resistance and capacitance in said other network whereby a flat response is obtained in a predetermined frequency range.

4. In combination, a modulator tube having control and screen grids therein, a source of modulating voltage for said tube, a plurality of amplification stages connecting the modulating voltage source with said screen grid, a source of radio frequency energy connected to said control grid, a plate circuit for said tube including an output filter network adapted to produce an output voltage in response to modulated radio frequency signals, said filter having a low impedance value with respect to signals having the frequency of said modulating voltage, a resistor in said plate circuit, a capacitor connected in shunt relationship with said resistor for providing a low impedance path for radio frequency voltages, a circuit path including a resistor and capacitor in series directly connected to one terminal of said output filter network for applying at least a portion of the voltage produced across said first-mentioned resistor in response to signals having the frequency of said modulating voltage to the first of said amplification stages in feedback relationship, the time constant of the resistor and capacitor in said feedback path being substantially equal to the time constant of said first-mentioned resistor and capacitor.

5. In combination, a modulator tube having control and screen grids therein, a source of modulating voltage for said tube, a plurality of amplification stages connecting the modulating voltage source with said screen grid, a source of radio frequency energy connected to said control grid, a plate circuit for said tube including a parallel resonant circuit tuned to the frequency of said radio frequency energy, a resistor in said plate circuit, a capacitor connected in shunt relationship with said resistor for providing a low impedance path for radio frequency energy, and a current path including a resistor and a capacitor in series for applying at least a portion of the voltage produced across said first-mentioned resistor to the first of said amplification stages in inverse feedback relationship, the time constant of said resistor and capacitor in said feedback path being substantially equal to the time constant of said first-mentioned resistor and capacitor whereby a flat response is obtained in a predetermined frequency range.

6. In a radio modulating system, a source of modulating energy, a source of carrier energy, means for amplifying said modulating energy, a mixer tube for combining the amplified modulating energy with the carrier energy, a source of anode voltage for said tube, a plate circuit connecting the anode of said tube to the positive terminal of said anode voltage source, a parallel resonant circuit included in said plate circuit, said resonant circuit being tuned to the frequency of said carrier energy to thereby provide a high impedance with respect to the carrier energy, a resistance in said plate circuit, a capacitance connected in shunt relationship with said resistance, said capacitance having a low impedance with respect to energy having the frequency of said carrier energy, means including a resistor and capacitor in series for applying the voltage produced across said first-mentioned resistor to said amplifying means in inverse feedback relationship, the time constant of the resistor and capacitor in said means for applying being substantially equal to that of said first-mentioned resistance and capacitance for maintaining the feedback voltage produced across said resistor substantially constant over the frequency range of said modulating energy.

7. In a radio modulating system, a source of modulating energy, a source of carrier energy, means for amplifying said modulating energy, a mixer tube for combining the amplified modulating energy with the carrier energy, a source of anode voltage for said tube, a plate circuit connecting the anode of said tube to the positive terminal of said anode voltage source, a parallel resonant circuit included in said plate circuit, said resonant circuit being tuned to the frequency of said carrier energy to thereby provide a high impedance with respect to the carrier energy, a resistance in said plate circuit, a capacitance connected in shunt relationship with said resistance, said capacitance having a low impedance with respect to energy having the frequency of said carrier energy, and means including a resistor and capacitor having a time constant substantially equal to the time constant of said first-mentioned capacitance and resistance for applying the voltage produced across the parallel combination of said capacitance and resistance to said amplifying means in inverse feedback relationship.

References Cited in the file of this patent

UNITED STATES PATENTS

| | | |
|---|---|---|
| 2,288,275 | Ferrell | June 30, 1942 |
| 2,372,101 | Madsen | Mar. 20, 1945 |
| 2,385,566 | De Guire | Sept. 25, 1945 |
| 2,728,891 | Legate | Dec. 27, 1955 |